3,375,205
SYNTHETIC ZEOLITE
Robert L. Wadlinger, Oneonta, N.Y., and Edward J. Rosinski, Almonesson, and Charles J. Plank, Woodbury, N.J., assignors to Mobil Oil Corporation, a corporation of New York
No Drawing. Filed Nov. 13, 1962, Ser. No. 237,289
15 Claims. (Cl. 252—455)

This invention relates to a new synthetic zeolite and to a method for preparing the same. The invention also is concerned with a catalytic composition comprising said zeolite and with catalytic conversion in the presence thereof.

Crystalline aluminosilicate zeolites structurally consist basically of an open three-dimensional framework of $SiO_4$ and $AlO_4$ tetrahedra. Such tetrahedra are cross-linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure, having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as "molecular sieves."

A number of synthetic crystalline zeolites have previously been prepared. They are distinguishable from each other and from naturally occurring zeolites on the basis of composition, crystal structure and adsorption properties. The existence of a number of zeolites having similar but distinguishable properties advantageously permits the selection of a particular member having optimum properties for a particular use.

Thus, it has heretofore been known to prepare a synthetic zeolite known as "zeolite A." Such material and preparation thereof has been described in U.S. 2,882,243. This zeolite is initially obtained in its sodium form, i.e. as a sodium aluminosilicate. Such material is capable of effectively sorbing water and straight chain compounds of three or less carbon atoms such as methane, ethane, n-propane, methanol, ethanol, n-propanol and the like. Sodium zeolite A, however, is incapable of adsorbing, to an appreciable extent, straight chain compounds having more than three atoms in the chain. Thus, it is only after replacement, by ion exchange, of a substantial proportion of the sodium ions of the initially obtained sodium zeolite A with divalent ions, such as calcium or magnesium that the pore characteristics thereof are such as to effect separation of straight chain hydrocarbons of more than 3 carbon atoms from admixture with branch chain or cyclic compounds. Sodium zeolite A, known commercially as Molecular Sieve 4A, is thus incapable of admitting into its crystalline structure molecules for which the maximum dimension of the minimum projected cross-section is greater than about 4.9 Angstroms. In order to produce a zeolite A capable of effecting separation of mixtures of straight chain and branched chain molecules or for separation of straight chain molecules from cyclic compounds having four or more atoms, it has heretofore been necessary to first carry out exchange of the initially obtained sodium zeolite A with another ion, such as calcium or magnesium, and to thereby effect exchange of the sodium ion to the extent of at least about 40 percent with such substituting ion. The resulting product, in which calcium is the introduced ion, is known commercially as Molecular Sieve 5A. This zeolite has larger pore dimensions than does 4A sieve and permits adsorption of molecules for which the maximum dimension of the minimum projected cross-section is about 5.5 Angstroms.

It has also been known prior to the present invention to synthesize a zeolite, known as zeolite ZK–4, more particularly described in copending application Ser. No. 134,841 filed Aug. 30, 1961 now U.S. Patent No. 3,314,752. This zeolite, which essentially in its sodium form, i.e. the form in which the zeolite is obtained from the preparative reaction mixtures, is capable of accomplishing separation of straight chain molecules having more than three atoms in the chain from non-straight chain, i.e. from branched chain and/or cyclic, molecules of more than three atoms without the necessity of converting such form zeolite into another ionic form by prior base-exchange such as has heretofore been necessary in achieving a synthetic zeolite of the above requisite pore characteristics.

The composition of zeolite ZK–4 can stoichiometrically be expressed, in terms of mole ratios of oxides as follows:

$$0.1 \text{ to } 0.3 \text{ R}:0.7 \text{ to } 1.0 \text{ M}_{2/n} \text{ O}:1 \text{ Al}_2\text{O}_3:2.5 \text{ to } 4.0 \text{ SiO}_2 \cdot \text{Y H}_2\text{O}$$

where R is selected from the group consisting of a methyl ammonium oxide, hydrogen oxide and mixtures thereof with one another; M is a metal and $n$ is the valence thereof and Y is any value from about 3.5 to about 5.5, said material being capable of selectively sorbing straight chain hydrocarbons of more than three carbon atoms from admixture of the same with non-straight chain hydrocarbons when M is sodium and capable of selectively sorbing water from admixture of the same with straight chain molecules having more than three atoms in the chain when M is potassium. Minor variations in the mole ratios of these oxides within the range indicated by the above formula do not significantly change the crystal structure or physical properties of the zeolite.

In accordance with the present invention, there is provided a new zeolite having an A type lattice and a silicon to aluminum content greater than that of zeolite ZK–4. This new zeolite, hereinafter referred to as "zeolite Alpha," has been found to possess its own unique properties.

In one embodiment, the present invention is directed to a crystalline synthetic material having the composition:

$$0.2 \text{ to } 0.5 \text{ R}_{2/m} \text{ O}:0.5 \text{ to } 0.8 \text{ M}_{2/n} \text{ O}:1 \text{ Al}_2\text{O}_3:>4.0 \text{ to } 7.0 \text{ SiO}_2 \cdot \text{Y H}_2\text{O}$$

where R represents ions selected from those of the group consisting of metal, methyl ammonium, hydrogen and mixtures thereof with one another; $m$ is the valence of R; M represents ions selected from those of the group consisting of hydrogen, metal and hydrogen-metal mixtures, $n$ is the valence of M and Y is any value up to about 8.0, said material being further characterized by the ability to selectively sorb straight chain hydrocarbons of more than three carbon atoms from admixture of the same with non-straight chain hydrocarbons when M is sodium and by an A type lattice as determined by X-ray diffraction.

In another embodiment, the invention provides for a crystalline synthetic material characterized by an A type lattice and having the composition:

$$0.2 \text{ to } 0.5 \text{ T}_2\text{O}:0.5 \text{ to } 0.8 \text{ M}_{2/n}\text{O}:1 \text{ Al}_2\text{O}_3:>4.0 \text{ to } 7.0 \text{ SiO}_2 \cdot \text{Y H}_2\text{O}$$

where M and Y have the above designated significance and T is a methyl ammonium ion.

The methyl ammonium ion is introduced upon crystallization of zeolite Alpha from a reaction mixture containing a tetramethylammonium ion and may, depending on the temperature conditions to which the zeolite is subjected be a mono, di, tri or tetra methyl substituted ammonium ion or a mixture of such substituted ions. Upon thermal activation of the product, i.e. by heating in an inert atmosphere at a temperature in the approximate range of 200 to 600° C., the methyl ammonium ion undergoes degradation to hydrogen ion.

It is a particular embodiment of the present invention, as in the manufacture of zeolite ZK-4, that zeolite Alpha is prepared from reaction mixtures containing a tetramethylammonium ion and more specifically, by heating in aqueous solution a mixture of the oxides or of materials whose chemical compositions can be completely represented as mixtures of the oxides $Na_2O$, $Al_2O_3$, $$[(CH_3)4N]_2O, SiO_2 \text{ and } H_2O$$

suitably at a temperature of about 50 to 90° C. for periods of time ranging from 15 minutes to 90 hours or longer. In contrast to manufacture of zeolite ZK-4, however, the minimum molar ratio of $SiO_2$ to $Al_2O_3$ in the reaction mixture employed for making zeolite Alpha is about 15. The composition of the reaction mixture, expressed in terms of mole ratios of oxides, preferably falls within the following ranges:

$SiO_2/Al_2O_3$ _____ of from about 15 to about 60.

$\dfrac{Na_2O}{Na_2O+[(CH_3)_4N]_2O}$ of from about .01 to about 0.3.

$\dfrac{H_2O}{Na_2O+[(CH_3)_4N]_2O}$ of from about 30 to about 60.

$\dfrac{Na_2O+[(CH_3)_4N]_2O}{SiO_2}$ of from about 0.5 to about 1.0.

The product which crystallizes from the hot reaction mixture is separated, suitably by centrifuging or filtration, washed with water until the effluent wash water in equilibrium with the zeolite has a pH of from about 9 to 12. The material, so obtained, is thereafter activated by heating in an inert atmosphere at a temperature in the approximate range of 200 to 600° C.

In making zeolite Alpha, the usual method comprises reacting, in aqueous media, sodium aluminate or an amorphorus sodium aluminosilicate gel with tetramethylammonium silicate or tetramethylammonium disilicate pentahydrate in a solution of tetramethylammonium hydroxide. Alternatively, an amorphous sodium aluminosilicate gel having a high silica to alumina ratio, i.e. greater than about 2.5, may be reacted in aqueous media with tetramethylammonium hydroxide solution. It is also feasible to prepare the reaction mixture by addition of colloidal silica to a solution of sodium aluminate in tetramethylammonium hydroxide. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, alhough mixing during such latter stages has not been found to be detrimental.

The crystallization procedures can be satisfactorily carried out at temperatures within the range from about 20° C. to about 90° C. The pressure during crystallization is atmospheric or at least that corresponding to the vapor pressure of water in equilibrium with the mixture of reactants, while temperatures as low as about 20° C. may be employed, such lower temperatures require a long reaction period. Preferably, a temperature of approximately 60 to 80° C. is employed. Heating is continued until the desired crystalline zeolite product is formed. The zeolite crystals are then separated from the mother liquor and washed, preferably with distilled water, until the effluent wash water in equilibrium with the product has a pH of between about 9 and about 12.

For satisfactory use as an adsorbent, zeolite Alpha should be activated by at least partial dehydration. Such activation can be effected, for example, by heating the zeolite to temperatures within the approximate range of 20 to 600° C. in an inert atmosphere, such as air or nitrogen, under atmospheric or reduced pressure, or by maintaining the zeolite at room temperature under vaccum.

In the synthesis of zeolite Alpha, it has been found that the composition of the reaction mixture is critical. Specifically, the presence of tetramethylammonium ions in such mixture has been found to be essential for the production of zeolite Alpha. In the absence of such ions or even in the presence of quaternary ammonium ions other than tetramethyl, no zeolite Alpha was obtained. The crystallization temperature and the length of time the crystallization temperature is maintained are important variables in determining the yield of crystalline material. Under some conditions, for example too low a temperature for too short a time, no crystalline product is realized. Extreme conditions may also result in the formation of materials other than zeolite Alpha.

The resulting crystalline synthetic aluminosilicate zeolite is one having the negative electrovalence of the aluminosilicate balanced by a cation consisting essentially of about 50 to 80 mole percent sodium oxide and about 20 to 50 percent of a methyl ammonium oxide, which zeolite is further characterized by a uniform effective pore diameter of about 5.5 Angstroms. When potassium is substituted for sodium the uniform effective pore diameter is reduced to below about 5 Angstroms.

Sodium oxide present in the reaction mixture may be derived from sodium aluminate or an amorphous sodium aluminosilicate gel. The latter is characterized by the following composition:

$$Na(AlO_2 \cdot X\ SiO_2)$$

where X is a number in the approximate range of 0.5 to 20. This material may be prepared by reaction of ethyl orthosilicate and sodium aluminate. Another suitable source of alumina and sodium oxide is a solution of aluminum turnings in sodium hydroxide. Silicate present in the reaction mixture may be derived from a variety of sources, for example, silica gel, silica hydrosol and silicate esters. Thus, silica is desirably introduced into the reaction mixture as a colloidal suspension having particles of about 170 A. in diameter or as tetramethylammonium silicate. The latter may be prepared by dissolving silica in tetramethylammonium hydroxide solution.

There are critical distinctions in the composition and sorption characteristics of zeolite Alpha and zeolite ZK-4 and zeolite A. Zeolite Alpha contains more silicon and less aluminum than zeolite ZK-4 which in turn contains more silicon and less aluminum than zeolite A. As is well known, the silicon-oxygen bond distance is shorter than the aluminum-oxygen bond distance. Zeolite Alpha accordingly, as observed by X-ray diffraction analysis, has a contracted lattice in comparison with zeolite A, which results in a shift in lines in its X-Ray pattern from zeolite A.

The unit cell formulae of zeolite Alpha, zeolite ZK-4 and zeolite A show that the former contains fewer sodium ions associated with the lattice of 24 silicon plus aluminum tetrahedra than do the latter zeolites. A striking difference in the sorptive properties of these zeolites has been observed. The calcined sodium form of zeolite Alpha has an enhanced capacity to sorb normal paraffins over zeolite ZK-4 or zeolite A. Such increase is believed attributable to the decrease in cation density as well as the cation volume decrease brought about by the relatively larger hydrogen ion to sodium ion ratio in the unit cell. The following Table I summarizes the differences in compositions and properties of Alpha, ZK–4 and A type zeolites:

materials. The zeolite may also find use in cyclic adsorption-desorption processes for water and other adsorbates. Zeolite Alpha may be used as an adsorbent for pur-

TABLE I

| Zeolite | Molar Chemical Composition | | | X-Ray Percent Shift from NaA | Sorption Capacity in Wt. % | | |
|---|---|---|---|---|---|---|---|
| | Na₂O | Al₂O₃ | SiO₂ | | Cyclohexane | n-Hexane | H₂O |
| NaA | 1.0 | 1.0 | 2.0 | 0 | <1 | <1 | 24 |
| NaZK–4 | 0.8 | 1.0 | 3.5 | 100 | <1 | 13 | 26 |
| Naα | 0.6 | 1.0 | 6 | 180 | 2 | 17 | 30 |
| Acid ZK–4 | 0.4 | 1.0 | 3.5 | | | 9 | 27 |
| Acid ZK–4 | 0.6 | 1.0 | 3.5 | | | 12 | 26 |
| Acid α | 0.0 | 1.0 | 6.0 | | 3 | 18 | 30 |
| CaZK–4 | 0.1 | 1.0 | 3.5 | | <1 | 11 | 22 |
| Caα | 0.1 | 1.0 | 6.0 | | 2 | 15 | 26 |

It will be seen from the foregoing that while each of the zeolites possessed good sorption characteristics for water and the property of excluding cyclohexane, there was a marked difference in the sorption characteristics of the zeolites as regards the sorption of n-hexane. Thus, while the sodium form of zeolite A was incapable of sorbing n-hexane to any appreciable extent, zeolite ZK–4 exhibited sorption characteristics for the straight chain hydrocarbon while excluding a cyclic hydrocarbon (cyclohexane) and the sodium form of zeolite Alpha exhibited even greater capacity to selectively sorb normal hydrocarbons. A similar enhanced capacity was observed for the acid and calcium forms of zeolite Alpha. This high sorption capacity of zeolite Alpha is, insofar as is known, unique. Such selective sorption characteristics, moreover, are extremely valuable in effecting separation of straight chain hydrocarbons from a mixture thereof with branch chain or cyclic hydrocarbons, such as occurs in petroleum and obviates the heretofore necessity of replacing the initially formed sodium ions of zeolite A with at least about 40 percent of calcium ions in order to provide an adsorbent with the above noted sorption characteristics. Also, of interest is the increase in silicon content of zeolite Alpha over zeolite ZK–4 and the corresponding increase in percent shift of X-ray diffraction angle from zeolite A. Likewise, the decrease in Na₂O relative to Al₂O₃ is noteworthy, demonstrating the difference in extent of tetramethylammonium ion admission into the crystal lattice. These differences are believed to account for:

(1) The increased capacity of zeolite Alpha to sorb n-hexane and water (2) The formation of a stable acid, i.e. hydrogen form, which results from calcination of a completely ammonium ion exchanged form.

The acid form of zeolite Alpha, in addition to being stable at 500° C., is stable to wetting with water as indicated by the absence of substantial change in the sorption properties of this calcined zeolite before and after wetting with water. Such stability indicates the potential stability of this zeolite to treatment with steam.

In addition to the adsorption characteristics, the rejection characteristics of zeolite Alpha are important. The interstitial channels of this zeolite are such that at their narrowest points, molecules with critical dimensions greater than about 5.5 Angstroms will not readily enter into the channels. Accordingly, molecules having critical dimensions greater than approximately 5.5 Angstroms will be rejected by the zeolite, while those having smaller critical dimensions will be adsorbed.

Another property of zeolite Alpha which contributes to its usefulness is that of adsorbing relatively large quantities of adsorbate at either very low pressures or concentrations. The novel zeolite described herein can therefore be utilized as a selective adsorbent in numerous gas or liquid separation processes, whereby small molecules such as water are separated from mixtures with other materials.

poses indicated above in any suitable form. For example, a column of powder crystalline material may afford excellent results as may a pelleted form obtained by pressing into pellets a mixture of zeolite Alpha and a suitable bonding agent, such as clay.

The compostions contemplated herein include not only the sodium form of zeolite Alpha as synthesized above from a sodium-aluminum-silicate-tetramethylammonium-water system with sodium as the exchangeable cation but also crystalline materials obtained from such a zeolite by partial or complete replacement of the sodium ion with other cations. The sodium cations can be replaced, at least in part, by other ions including those of metals below sodium in the electromotive series, calcium, ammonium, hydrogen and combinations of such ions with one another. Particularly preferred for such purpose are the alkaline earth metal ions; Group II metal ions of the transition metals such as manganese and nickel, the rare earth metals such as cerium, lanthanum, praseodymium, neodymium, samarium and mixtures thereof with each other and the other rare earths; and other ions, for example, hydrogen and ammonium which behave in zeolite Alpha as metals in that they can replace metal ions without causing any appreciable change in the basic structure of the zeolite crystal. The transition metals are those whose atomic numbers are from 21, to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, platinum, hafnium, tantalum, tungsten, rhenium, osmium and iridium.

Ion exchange of the sodium form of zeolite Alpha may be accomplished by conventional methods. A preferred continuous method is to pack zeolite Alpha into a series of vertical columns and successively pass through the beds a water solution of a soluble salt of the cation to be introduced into the zeolite; and change the flow from the first bed to the second bed as the zeolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations.

In identification of zeolites, the X-ray powder diffraction pattern has been found useful. X-ray diffraction powder patterns of zeolite Alpha were obtained utilizing standard techniques. The radiation was the Kα doublet of copper and a Geiger counter spectrometer with a strip chart pen recorder was used. The peak heights, I, and the postions as a function of 2φ, where φ is the Bragg angle, were read from the spectrometer chart. From there, the relative intensities, $$100I/I_0$$

where $I_0$ is the intensity of the strongest line or peak and $d$ (obs), the interplanar spacing in A., corresponding to the recorded lines were calculated. The cell constant for zeolite Alpha, i.e. the dimension of the edge of the cubic unit cell was determined as 12.04 A.±0.14 A. X-ray powder diffraction data for typical zeolite Alpha samples are set forth in Table A hereinbelow.

TABLE A

| Naα I/I₀ | Example 6 d (A.) | Naα I/I₀ | Example 1 d (A.) | Naα I/I₀ | Example 8 d (A.) |
|---|---|---|---|---|---|
| 76 | 12.06 | 62 | 12.05 | 68 | 12.03 |
| 67 | 8.53 | 78 | 8.52 | 69 | 8.51 |
| 81 | 6.96 | 90 | 6.95 | 70 | 6.94 |
| 8 | 6.00 | 6 | 6.00 | 8 | 6.00 |
| 27 | 5.38 | 35 | 5.38 | 26 | 5.38 |
| 6 | 4.91 | 5 | 4.90 | 5 | 4.91 |
| 42 | 4.26 | 37 | 4.25 | 38 | 4.26 |
| 88 | 4.01 | 86 | 4.01 | 86 | 4.02 |
| 10 | 3.80 | 8 | 3.80 | 9 | 3.80 |
| 100 | 3.63 | 100 | 3.63 | 100 | 3.63 |
| 64 | 3.34 | 55 | 3.35 | 63 | 3.34 |
| 60 | 3.22 | 55 | 3.22 | 64 | 3.21 |
| 2 | 3.00 | 1 | 3.00 | 2 | 3.01 |
| 84 | 2.91 | 67 | 2.92 | 87 | 2.91 |
| 24 | 2.84 | 24 | 2.84 | 25 | 2.83 |
| 6 | 2.69 | 7 | 2.69 | 10 | 2.68 |
| 8 | 2.63 | 9 | 2.63 | 10 | 2.62 |
| 32 | 2.56 | 34 | 2.57 | 35 | 2.56 |
| 12 | 2.46 | 7 | 2.46 | 8 | 2.45 |
| 4 | 2.41 | 4 | 2.41 | 2 | 2.40 |
| 2 | 2.37 | 5 | 2.36 | 4 | 2.36 |
| 7 | 2.36 | 13 | 2.32 | 7 | 2.31 |
| 10 | 2.32 | 14 | 2.21 | 5 | 2.19 |
| 8 | 2.20 | 24 | 2.13 | 11 | 2.12 |
| 15 | 2.13 | 7 | 2.10 | 3 | 2.09 |
| 5 | 2.10 | 10 | 2.07 | 4 | 2.06 |
| 6 | 2.07 | 8 | 2.037 | 3 | 2.030 |
| 3 | 2.036 | 37 | 2.010 | 19 | 2.003 |
| 27 | 2.008 | 3 | 1.952 | 3 | 1.953 |
| 4 | 1.951 | 1 | 1.928 | 9 | 1.877 |
| 2 | 1.927 | 1 | 1.908 | 9 | 1.854 |
| 1 | 1.906 | 19 | 1.883 | 2 | 1.812 |
| 15 | 1.882 | 24 | 1.860 | 2 | 1.791 |
| 13 | 1.859 | 1 | 1.835 | 2 | 1.716 |
| 2 | 1.833 | 6 | 1.815 | 21 | 1.699 |
| 2 | 1.815 | 6 | 1.798 | 16 | 1.650 |
| 3 | 1.797 | 6 | 1.720 | 4 | 1.635 |
| 3 | 1.718 | 37 | 1.704 | 12 | 1.592 |
| 35 | 1.701 | 3 | 1.690 | 9 | 1.565 |
| 4 | 1.688 | 28 | 1.655 | 1 | 1.539 |
| 22 | 1.656 | 7 | 1.639 | 2 | 1.491 |
| 5 | 1.637 | 1 | 1.609 | 3 | 1.479 |
| 2 | 1.607 | 13 | 1.596 | 1 | 1.470 |
| 12 | 1.594 | 18 | 1.569 | 3 | 1.463 |
| 16 | 1.567 | 13 | 1.543 | 3 | 1.453 |
| 12 | 1.540 | 1 | 1.529 | 3 | 1.439 |
| 2 | 1.528 | 4 | 1.506 | 2 | 1.420 |
| 3 | 1.504 | 5 | 1.493 | 3 | 1.411 |
| 3 | 1.492 | 4 | 1.483 | 5 | 1.401 |
| 3 | 1.483 | 5 | 1.453 | 4 | 1.391 |
| 2 | 1.452 | 6 | 1.444 | 9 | 1.370 |
| 3 | 1.441 | 1 | 1.435 | 5 | 1.338 |
| 2 | 1.402 | 2 | 1.420 | 13 | 1.329 |
| 3 | 1.392 | 1 | 1.411 | | |
| 13 | 1.373 | 8 | 1.404 | | |
| 6 | 1.338 | 3 | 1.394 | | |
| 18 | 1.332 | 15 | 1.375 | | |
| | | 6 | 1.339 | | |
| | | 23 | 1.332 | | |

Highly active hydrocarbon conversion catalysts may be obtained by treating the above described crystalline zeolite Alpha with a fluid medium containing a hydrogen ion or ion capable of conversion to a hydrogen ion in an amount sufficient to impart catalytic properties thereto. The catalysts so obtained possess a wide spectrum in magnitude of catalytic activity; can be used in extremely small concentrations; and permit certain hydrocarbon conversion processes to be carried out under practicable and controllable rates at temperatures much lower than those previously employed. In the catalytic cracking of hydrocarbon oils into hydrocarbon products of lower molecular weight, the reaction rates per unit volume of catalyst that are obtainable by hydrogen treated zeolite Alpha may vary up to several fold the rates achieved with siliceous catalysts heretofore proposed. These catalysts furthermore can be used directly as the sole catalytic constituent or as intermediates in the preparation of further modified contact masses having catalytic properties. Such modified contact masses may comprise the treated crystalline zeolite per se or a dispersed mixture of the treated aluminosilicates with a predetermined amount of an inert and/or catalytically active material which serves as a binder or matrix for the catalyst constituent.

The high activity catalysts contemplated are obtained by contacting zeolite Alpha with a fluid medium containing hydrogen ions or ions capable of conversion thereto, washing the treated material free of soluble anions, and thereafter drying and thermally activating the product by heating at temperatures ranging from about 400° F. to 1500 F. for a period between about 1 to 48 hours. The resulting product is an activated aluminosilicate, strongly acidic in character, which contains less than about 10% by weight metal and substantially corresponds to the hydrogen form of the zeolite Alpha precursor material. When subsequently used alone or combined in a state of particle size of less than about 40 microns, dispersed or otherwise intimately admixed with a suitable matrix, such as an inorganic oxide gel, the resulting product has been found to be active as a catalyst for hydrocarbon conversion.

In preparing the above catalyst, zeolite Alpha is contacted with a non-aqueous or aqueous fluid medium comprising as gas, polar solvent or water solution containing the hydrogen ion or ion capable of conversion thereto. Typical sources of hydrogen ions include organic and inorganic acids whereas ammonium ions are representative ions capable of conversion to hydrogen ions. Water is the preferred fluid medium for reasons of economy and ease of preparation in large scale operations involving continuous or batchwise treatment. Similarly, for this reason, organic solvents are less preferred but can be employed providing the solvent permits ionization of the acid or ammonium compound. Typical solvents include cyclic and acyclic ethers such as dioxane, tetrahydrofuran, ethyl ether, diethyl ether, diisopropyl ether and the like; ketones such as acetone and methyl ethyl ketone; esters such as ethyl acetate, propyl acetate; alcohols such as ethanol, propanol, butanol, etc. and miscellaneous solvents such as dimethylformamide and the like.

The hydrogen ion or ammonium ion may be present in the fluid medium in an amount varying within wide limits dependent upon the pH value of the fluid medium. Thus, the pH value for fluid media containing a hydrogen ion ranges from about 3.8 to 7.0 and is preferably within a pH value ranging from 4.0 to 4.5. When ammonium ions are employed, either alone or in combination with hydrogen ions, the pH value ranges from 4.5 to 12.0 and is preferably within the limit of about 4.5 to 9.5.

In carrying out the treatment with the fluid medium, the procedure employed comprises contacting zeolite Alpha or a derivative thereof, wherein ions heretofore represented as R have been partially or completely replaced by other metal cations, with the desired fluid medium until such time as metallic cations are effectively reduced by an amount of at least 10 percent, preferably about 40 to 75 percent or more, to provide a hydrogen aluminosilicate having a metal content of less than about 10 percent by weight, and preferably less than about 5 percent by weight. Effective treatment with the fluid medium to obtain the corresponding hydrogen aluminosilicate will vary with the duration of the treatment and temperature at which it is carried out. Elevated temperatures tend to hasten the speed of treatment whereas the duration thereof varies inversely with the hydrogen ion or ammonium ion concentration of the fluid medium. In general, it may be stated that the temperatures employed range from ambient temperature up to temperatures below the decomposition temperature of the aluminosilicate. Following the fluid treatment, the treated aluminosilicate is washed with water, preferably distilled water, until the effluent wash water has a pH value of wash water, i.e. between about 5 and 8. The aluminosilicate is thereafter dried and activated by heating in an inert atmosphere at temperatures ranging from about 400° F. to 1500 F. whereby ammonium ions, if present, undergo conversion to hydrogen ions.

Treatment of zeolite Alpha with the fluid medium containing hydrogen ions may be effected in a batchwise or continuous operation under atmospheric, subatmospheric or superatmospheric pressure. A solution of the hydrogen ion or ammonium ion, in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

The compositions resulting from treatment of zeolite Alpha with fluid hydrogen ion-containing media as described hereinabove may be employed as catalysts in a wide variety of hydrocarbon conversion processes including isomerization, disproportionation, hydration of olefins, amination of olefins, oxidation, dehydrogenation, dehydration of alcohols, desulfurization, hydrogenation, reforming, hydrocracking, polymerization and the like. The catalysts are exceptionally stable and are particularly useful in such of the above and related processes carried out at temperatures ranging from ambient temperatures of 70° F. up to 1000° F., including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

The catalysts may be used as such or as intermediates in the preparation of further modified contact masses comprising inert or catalytically active materials which serve as a support or matrix for the aluminosilicate. The catalyst may be used in powdered, granular or molded state formed into spheres or pellets of finely divided particles having a particle size of 2 to 500 mesh. In cases where the catalyst is molded, such as by extrusion, the aluminosilicate may be extruded before drying, or dried or partially dried and then extruded. The catalyst product is then preferably precalcined in an inert atmosphere or may undergo calcination initially during use in the conversion process. Generally, the composition is dried between 150° F. and 600° F. and thereafter calcined in air or an inert atmosphere of nitrogen, hydrogen, helium, flue gas or other inert gas at temperatures ranging from 400° F. to 1500° F. for periods of time ranging from 1 to 48 hours or more.

Another aspect of the invention resides in the provision of a useful adsorbent or catalytic composition comprising zeolite Alpha distributed throughout and held suspended in a matrix of a binder therefor. When intended for use as catalyst, the negative electrovalence of the silica and alumina of the aluminosilicate is preferably balanced by ions of at least one member selected from the group consisting of metals below sodium in the electromotive series, calcium, ammonium, hydrogen and combinations of such ions with one another. Particularly preferred replacing ions includes those of the alkaline earth metals, rare earth metals, manganese, ammonium and combinations of such ions with one another. Zeolite Alpha, either before or after the indicated ion exchange, is intimately admixed in finely divided form with a binder therefor under conditions such that the aluminosilicate is distributed throughout and held suspended in a matrix of the binder. In those instances where the alkali metal form of zeolite Alpha is initially mixed with the binder, ion exchange of the resulting composite may subsequently be carried out to effect replacement of the alkali metal ions with one or more ions of the group referred to hereinabove.

Thus, in one aspect, the present invention affords a method for preparing a useful adsorbent or catalytic composition by dispersing in an inorganic oxide sol a finely divided Alpha aluminosilicate either in alkali metal form or after substantially complete base exchange of the alkali metal content thereof with a solution containing ions of at least one member selected from the group consisting of metals below sodium in the electromotive series, calcium, ammonium, hydrogen and combinations of such ions with one another, effecting gelation of the sol containing finely divided aluminosilicate, washing the resulting composite free of soluble matter, drying, calcining and thereafter preferably treating the calcined composite with steam. In another embodiment, there is provided a hydrocarbon conversion catalyst comprising 1 to 90 percent by weight of crystalline zeolite Alpha, the original alkali metal ions of which have been substantially completely replaced by ions of at least one member selected from the group consisting of metals below sodium in the electromotive series, calcium, ammonium, hydrogen and combinations of such ions with one another, in which zeolite Alpha has a weight mean particle diameter of less than 40 microns and preferably less than 15 microns, suspended in and distributed throughout a hydrous oxide matrix selected from the group consisting of clays and inorganic oxide gels. In still another embodiment of the invention, there is provided a composition comprising spheroidal particles comprising 1 to 50 percent by weight of zeolite Alpha either in alkali metal form or having the original alkali metal ions substantially completely replaced with ions of at least one member selected from the group consisting of metals below sodium in the electromotive series, calcium, ammonium, hydrogen and combinations of such ions with one another, and in which zeolite Alpha has a weight mean particle diameter of between 2 and 7 microns suspended in and distributed throughout a matrix of an inorganic oxide gel. Particularly preferred are gels consisting of alumina, silica and composites of silica and an oxide of at least one metal selected from Groups II, III, IV, V, VI, VII and VIII of the Periodic Table. In particular, preference is accorded plural gels of silica with metal oxides of Groups II–A, III–B and IV–A of the Periodic Table wherein the metal oxide is magnesia, alumina, zirconia, beryllia or thoria.

The catalytic compositions of the invention are suitably prepared by base exchange of the above crystalline alkali metal zeolite Alpha with ions of at least one member selected from the group consisting of metals below sodium in the electromotive series, calcium, ammonium, hydrogen and combinations of such ions with one another to replace at least 70 and preferably more than 80 percent of the original alkali metal ions with ions of the aforementioned group. As utilized herein, the electromotive series is that defined in the Handbook of Chemistry and Physics, 43rd edition, published by Chemical Rubber Publishing Company. The catalytic compositions of the present invention may be prepared by intimately admixing a crystalline zeolite Alpha described hereinabove generally having a weight mean particle diameter of less than 40 microns and preferably less than about 15 microns with a suitable binder such as metal powder, clay or an inorganic oxide gel, base exchanging the resulting composite substantially free of alkali metal by treating with a solution containing ions of at least one member selected from the group consisting of metals below sodium in the electromotive series, calcium, ammonium, hydrogen and combinations of such ions with one another and washing, drying and calcining the resulting composite. Alternatively and preferably, the crystalline alkali metal form of zeolite Alpha may undergo base exchange as above prior to intimate admixture thereof with the binder. In accordance with such manner of operation, the resulting mixture of finely divided previously base exchanged zeolite Alpha distributed throughout and held suspended in a matrix of the binder is washed, base exchanged, if necessary, to remove zeolitic alkali metal from the binder, dried and calcined as described hereinabove. The exchangeable alkali metal content of the resulting catalytic composite obtained by the foregoing procedure is generally below 3 percent and preferably less than 2 percent by weight.

Intimate admixture of the finely divided zeolite Alpha and binder, such as metal powder, clay or inorganic oxide hydrogel, may be accomplished for example by ball milling the two materials together over an extended period of time, preferably in the presence of water under conditions to reduce the particle size of the zeolite to a weight mean particle diameter of less than 40 and preferably less than 15 microns. Such method of admixture, however, is less preferred than that achieved by dispersing zeolite Alpha in finely divided form in an inorganic hydrous oxide such as a hydrosol or hydrogel. Following this procedure, the finely divided aluminosilicate may be dispersed in an already prepared hydrogel or hydrosol or, as is preferable, where the hydrosol is characterized by a short time of gelation, the finely divided zeolite Alpha may be added to one or more of the reactants used in forming the hydrosol or may be admixed in the form of a separate stream with streams of the hydrosol-forming reactants in a mixing nozzle or other means where the reactants are brought into intimate contact. As noted hereinabove, it is desirable that the zeolite Alpha introduced into the hydrosol have a weight mean particle diameter of less than about 40 microns and preferably less than 15 microns and when large particles are desired, between 2 and 7 microns. The use of zeolite Alpha having a weight mean particle diameter in excess of 40 microns gives rise to a physically weak product while the use of such material having a weight mean particle diameter of one micron produced a product of low diffusivity.

The powder-containing inorganic oxide hydrosol sets to a hydrogel after lapse of a suitable period of time and the resulting hydrogel is base exchanged if zeolitic alkali metal has been introduced as a result of employing an alkali metal silicate and is thereafter washed, dried to a gel and thermally activated at a temperature below the fusion point of the incorporated zeoline Alpha powder. It has been found that the resulting product consisting essentially of zeolite Alpha, the cation of which is selected from the group consisting of metals below sodium in the electromotive series, calcium, ammonium and hydrogen and combinations of such ions with one another, suspended in and distributed throughout a matrix of inorganic oxide gel possess unique properties as a treating and catalytic composition.

In addition to the above described zeolite Alpha, it has been found desirable in some instances to include in the matrix along with the finely divided zeolite Alpha, a secondary solid additive also in finely divided form, generally in the particle size range of 1 to 40 microns weight means particle diameter, capable of imparting increased diffusivity to the resulting composition. Such additive material may be inert or may contribute to the overall catalytic activity of the final composite. The amount of such additive may extend up to 40 percent by weight of the composition. Generally when the catalyst is in the form of gel beads, the weight mean particle diameter of the additive material is less than 10 microns. Suitable additives for the above purpose include by way of example, clay, alumina, zircon, barytes, carbon, wood flour, silica, recycle catalyst fines, magnesia, spent cracking catalyst fines and various ores and naturally occurring minerals. These additives may be retained in the final composition or in the case of combustible materials, such as carbon or wood flour, may have previously been removed as a result of exposing the composite composition either through subsequent preparational treatment or during use to an elevated temperature.

The binder constituting the matrix of the present catalyst should be thermally stable under the conditions at which the reaction is carried out. Thus, it is contemplated that solid porous adsorbents, carriers and supports of the type heretofore employed in catalytic operations may feasibly be used in combination with the crystalline zeolite Alpha above described. Such materials may be catalytically inert or may possess an intrinsic catalytic activity or an activity attributable to close association or reaction with the crystalline zeolite Alpha. Such materials include, by way of example, dried inorganic oxide gels and gelatinous precipitates of alumina, silica, zirconia, magnesia, hafnia, thoria, titania, boria and combinations of these oxides with one another and with other components. Other suitable binding materials include activated charcoal, metal powders, mullite, kieselguhr, activated carbon, bauxite, silicon carbide, sintered alumina, and various clays. Preferably, zeolite Alpha is intimately composited with a hydrous oxide material such as an inorganic oxide gel or clay as described above.

While inorganic oxide gels generally may be utilized as a suitable matrix, it is preferred that the inorganic oxide gel employed be a cogel of silica and an oxide of at least one metal selected from the group consisting of metals of Groups II–A, III–B and IV–A of the Periodic Table. Such components include, for example, silica-alumina, silica-magnesia, silica-zirconia, silica-halfnia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and oxides of the metals are present in minor proportion. Thus, the silica content of such gels is generally within the approximate range of 55–100 weight percent with the metal oxide content ranging from 0–45 weight percent. The inorganic oxide hydrosols utilized herein and hydrogels obtained therefrom may be prepared by any method well known in the art such as, for example, hydrolysis of ethyl ortho silicate, acidification of an alkali metal silicate which may contain a compound of a metal, the oxide of which it is desired to cogel with silica, etc. The relative proportions of finely divided crystalline aluminosilicate and matrix may vary widely with the crystalline aluminosilicate content ranging from about 1 to 90 percent by weight and more usually, particularly where the composite is prepared in the form of beads, in the range of about 1 to about 50 percent by weight of the composite.

The catalyst of this invention may be prepared in any desired physical form. Preferably, it is used in the form of small fragments of a size best suited for operation under the specific conditions existing. Thus, the catalyst may be in the form of finely divided powder or may be in the form of pellets of $\frac{1}{16}''$ to $\frac{1}{8}''$ size, for example, obtained upon pelleting, casting or extruding in accordance with well known techniques. A hydrosol containing added crystalline aluminosilicate powder may be permitted to set in mass to a hydrogel which is thereafter dried and broken into pieces of desired size. The pieces of gel so obtained are generally of irregular shape. Uniformly shaped pieces of gel may be obtained by extrusion or pelleting of the aluminosilicate-containing hydrogel. Also, the hydrogel may be introduced into the perforations of a perforated plate and retained therein until the sol has set to a hydrogel, after which the formed hydrogel pieces are removed from the plate. A particularly feasible method is to prepare the catalyst in the form of spheroidal particles by dispersing the powder aluminosilicate in a hydrosol and introducing globules of the resulting hydrosol into a body of water-immiscible liquid, for example an oil medium, wherein the globules of hydrosol set to a hydrogel and subsequently pass into an underlying layer of water from which they are sluiced to further processing operations such as base exchange, water-washing, drying, and calcining. Larger size spheres are ordinarily within the range of from about 1/64 to about 1/4" in diameter, whereas smaller size spheres, which are generally referred to as microspheres and formed by spray drying or other well developed techniques, are within the range of from about 20 to about 300 microns in diameter. The use of the spheroidally shaped particles is of particular advantage in hydrocarbon conversion processes in which the catalyst is subjected to continuous movement such as the compact moving bed process, the fluidized process, etc. As applied to the stationary bed, spheroidal catalyst particles provide effective contact between the reactants and the catalyst by avoiding channeling.

While for the production of spheroidal catalyst particles by the aforementioned technique, initial formation of a hydrosol which sets upon lapse of a short interval of time to an all-embracing bead-form hydrogel is essential, it is also feasible to employ particularly where the catalyst is prepared in a form other than the spheroidal shape, a matrix comprising a gelatinous hydroxide precipitate with varying degrees of hydration or a mixture of a hydrogel and such gelatinous precipitate. The term "gel" as utilized herein is intended to include hydrogel, gelatinous precipitates, and mixtures of the two. Also, the matrix may consist of or contain as a component thereof a clay and particularly a clay of the montmorillonite or kaolinite families either raw or acid treated.

Another class of suitable matrix materials include powdered metals not susceptible to oxidation under the reaction conditions encountered. Suitable metal powders include, by way of example, aluminum; iron-containing alloys, such as stainless steel and various other metals characterized by stability under the conditions of operation. Other suitable materials for use as the matrix of the present catalyst composition include charcoal, graphite, bauxite, and other binders compatible with the crystalline metal aluminosilicate and thermally stable under the temperature conditions at which the catalyst is used.

As indicated hereinabove, crystalline alkali metal zeolite Alpha undergoes base exchange with ions of at least one member selected from the group consisting of metals below sodium in the electromotive series, calcium, ammonium, hydrogen and combinations of such ions with one another. Representative of the aforementioned metals are manganese, the alkali earth metals, such as calcium and magnesium; the rare earth metals, such as cerium, praseodymium, lanthanum, neodymium, samarium, gadolinium and mixtures thereof. Base exchange is carried out to replace at least 70 and preferably more than 80 percent of the original alkali metal ions with ions of the abovementioned group and to reduce the exchangeable alkali metal content of the finished catalyst to below 3 percent. The aluminosilicate in finely divided form and bound together in the form of aggregate particles with a suitable binder or matrix material may be base exchanged either before or after intimate admixture with the binding material. Base exchange is effected by treatment with a solution containing ions which it is desired to introduce into the aluminosilicate. It is contemplated that any ionizable compound furnishing ions of hydrogen, ammonium or the aforementioned metals may be employed for base exchange. Generally, an aqueous solution of such compounds will be employed. A particularly effective base exchange solution is one containing one or more metals below sodium in the electromotive series and ammonium ions, including complex ammonium ions, wherein the ratio of metal to ammonium ions is between 10/1 and 1/100 to effect replacement of the alkali metal ion with the aforesaid metal and ammonium ions. The exchangeable alkali metal content of the finished catalyst should be less than about 3 and preferably less than about 2 percent by weight. The base exchange solution may be contacted with the crystalline aluminosilicate in the form of a fine powder, a compressed pellet, extruded pellet, spheroidal bead or other suitable particle shape. It has been found that the desired base exchange may be effected most readily if the alkali metal aluminosilicate undergoing treatment has not previously been subjected to a temperature above about 600° F.

The temperature at which base exchange is effected may vary widely, generally ranging from room temperature to an elevated temperature below the boiling point of the treating solution. While the volume of base exchange solution employed may vary widely, generally an excess is employed and such excess is removed from contact with the crystalline aluminosilicate after a suitable period of contact. The time of contact between the base exchange solution and crystalline aluminosilicate in any instance in successive contacts is such as to effect replacement of the alkali metal ions thereof to an extent such that the exchangeable alkali metal content of the finished catalytic composite is less than 3 percent by weight. It will be appreciated that such period of contact may vary widely depending on the temperature of the solution and the particular compound employed for base exchange. Thus, the time of contact may extend from a brief period of the order of a few hours for small particles to longer periods of the order of days for large pellets.

After base exchange treatment, the product is removed from the treating solution. Anions introduced as a result of treating with the base exchange solution may, if desired or necessary, be removed by washing the treated composite for such period of time until the same is free of said anions. The washed product is then dried generally in air to remove substantially all of the water therefrom. While drying may be effected at ambient temperature, it is more satisfactory to facilitate removal of moisture by maintaining the product at a temperature between about 150 and about 600° F. for 4 to 48 hours.

The dried material can then be subjected to calcination by heating in an inert atmosphere, i.e. one which does not adversely effect the catalyst such as air, nitrogen, hydrogen, flue gas, helium or other inert gas. Generally, the dried material is heated in air to a temperature in the approximate range of 500° F. to 1500° F. for a period of at least about 1 hour and usually between 1 and 48 hours.

It has further been found that the catalyst selectivity of the above-described composition is greatly improved by subjecting the same to a mild steam treatment. Exposure of the catalyst to steam is a highly desirable step in obtaining a product capable of affording an enhanced yield of gasoline. Steam treatment may be carried out at a temperature within the approximate range of 400 to 1450° F. for at least about 2 hours. Usually steam at a temperature of about 1000° F. to 1400° F. will be used with the treating period extending from about 2 to about 100 hours. Also, an atmosphere consisting of a substantial amount of steam, say at least about 5 percent by volume but containing air or other gas substantially inert with respect to the composite being treated may be used and such mixtures, may, in some instances, be desirable with the use of the more elevated temperatures to avoid possible deactivation of the catalyst. Steam treatment may be effected at pressures from atmospheric up to about 500 p.s.i.g. The abovenoted steam treatment serves to reduce the surface area of the calcined composite. Thus, it is particularly preferred to subject the above described calcined catalytic composition to treatment with steam to reduce the surface area thereof by at least about 20 percent but not in excess of about 75 percent.

The following examples will serve to illustrate the product and method of the present invention without limiting the same:

*Example 1*

Two and three-tenths (2.3) grams of sodium aluminate were dissolved in 66.4 ml. of a 4.2 N solution of tetramethylammonium hydroxide. To the resulting solution was added with rapid stirring 62.1 grams of an aqueous suspension of LS Ludox colloidal silica containing 30 weight percent $SiO_2$. Stirring was continued until a smooth slurry resulted. The resulting mixture was aged at 78° C. for about six days. Crystalline solid present at the end of such time was filtered from the mother liquor under vacuum and then washed with distilled water to a pH of 10 or less. The separated crystalline product was dried in air and then calcined at 500° C. for 17 hours. The crystalline product had the following properties:

X-ray: Type A structure, contracted lattice, 160% shift from sodium zeolite A.

Molar composition: $0.59Na_2O/1.0Al_2O_3/6.08SiO_2$

Sorption properties:      Wt. percent sorbed
    Cyclohexane ---------------------------------- 1.9
    n-Hexane ------------------------------------ 16.9
    Water --------------------------------------- 29.4

Examples 2–5

The procedure of Example 1 was followed employing different ratios of reactants. The reactant mixture compositions and the properties of the respective products of these examples are shown in Table II below:

TABLE II

| Ex. | NaAlO₂, g. | TMA Hydroxide Ml. | TMA Hydroxide N | Ludox, g. | Cryst. Period (days) | Product, Molar Composition Na₂O | Product, Molar Composition Al₂O₃ | Product, Molar Composition SiO₂ | X-Ray Percent Shift from Sodium Zeolite A | Sorption Capacity, wt. percent Cyclohexane | Sorption Capacity, wt. percent n-Hexane | Sorption Capacity, wt. percent H₂O |
|---|---|---|---|---|---|---|---|---|---|---|---|---|
| 2 | 2.3 | 70 | 3.9 | 62.1 | 6 | 0.57 | 1.0 | 5.81 | 160 | 2.6 | 16.9 | 28.4 |
| 3 | 2.3 | 63 | 3.9 | 51.0 | 5 | 0.62 | 1.0 | 4.73 | 120 | 1.2 | 16.0 | 26.9 |
| 4 | 2.3 | 70 | 3.6 | 45.0 | 3 | 0.70 | 1.0 | 4.19 | 110 | 0.8 | 15.5 | 26.5 |
| 5 | 2.3 | 100 | 3.6 | 62.1 | 3 | 0.80 | 1.0 | 4.48 | 115 | 1.3 | 14.8 | 27.2 |

Example 6

Sodium aluminate in the amount of 2.3 grams was dissolved in 70 ml. of a 3.9 N aqueous solution of tetramethylammonium hydroxide. To the resulting solution maintained at room temperature, there was added 0.13 gram of the calcined product of Example 1. The resulting suspension was rapidly agitated and 62.1 grams of LS Ludox colloidal silica was then added with continued stirring until a smooth slurry resulted. Such material was then aged at 78° C. for about 6 days. The crystalline product obtained was then separated from the mother liquor, washed, dried and calcined as in Example 1. The resulting calcined product had the following properties:

X-ray: A-type structure, contracted lattice, 180% shift from sodium zeolite A.

Molar composition: $0.57Na_2O/1.0Al_2O_3/5.94Al_2O_3$

Sorption properties:      Wt. percent sorbed
    Cyclohexane ---------------------------------- 2.9
    n-Hexane ------------------------------------ 16.8
    Water --------------------------------------- 27.9

Example 7

The portions of the product of Example 2 which were used for hexane sorption analysis were calcined at 500° C.; then contacted with an aqueous solution of 24 weight percent $CaCl_2$ at 80° C. for sufficient time to permit essentially complete exchange of the original sodium ions with calcium ions. The calcined product had the following sorption properties:

Wt. percent sorbed
Cyclohexane ---------------------------------- 2.4
n-Hexane ------------------------------------ 15.2
Water --------------------------------------- 25.8

Example 8

Silica gel (98 wt. percent $SiO_2$) in the amount of 18.6 grams was dissolved in 70 ml. of 3.9 N aqueous solution of tetramethylammonium hydroxide. To the resulting solution was added with rapid stirring a solution of 2.3 grams of sodium aluminate dissolved in 43.5 ml. of water. After 6 days of aging the resulting mixture at 78° C., crystalline solid was separated and treated as in Example 1. The calcined product had the following properties:

X-ray: Type A structure, contracted lattice, 160% shift from sodium zeolite A.

Molar composition: $0.67Na_2O/1.0Al_2O_3/5.4SiO_2$

Sorption properties:      Wt. percent sorbed
    Cyclohexane ---------------------------------- 1.7
    n-Hexane ------------------------------------ 16.4
    Water --------------------------------------- 28.8

The following example illustrates the preparation of the acid form of zeolite Alpha:

Example 9

A portion of the zeolite product produced in accordance with Example 6 which had been used for the hexane adsorption test and heated to 500° F. to remove the adsorbed hexane was subjected to base exchange. The latter was accomplished by contacting the aluminosilicate with a 10 weight percent aqueous solution of ammonium chloride at 80° C. involving 10 contacts for 1½ hours duration and 2 contacts overnight. The exchanged aluminosilicate was then washed free of chloride ion with 2 liters of water, air dried and then calcined at 500° C. overnight. The resulting calcined product had the following properties:

Molar composition: $0.0Na_2O/1.0Al_2O_3/6.0SiO_2$

Sorption properties:      Wt. percent sorbed
    Cyclohexane ---------------------------------- 2.8
    n-Hexane ------------------------------------ 17.9
    Water --------------------------------------- 30.0

The molar composition indicates substantially complete replacement of sodium ion with hydrogen ion.

The following examples illustrate Alpha zeolite embodied in a porous matrix:

Example 10

The alpha aluminosilicate was prepared as follows: 481 grams of LS Ludox colloidal silica were added with stirring to a solution of 18.1 grams of sodium aluminate dissolved in 550 ml. of a 3.9 N aqueous solution of tetramethylammonium hydroxide. The stirring was continued until a homogenous slurry resulted. After 10 days of aging at 75° C., the solids formed were separated from the mother liquor by decantation and then dried at 100° C. for 17 hours.

The resulting crystalline product, along with added clay, was thereafter embodied in a silica hydrogel to form a catalyst containing 20 weight percent zeolite Alpha, 5 weight percent clay and 75 weight percent silica.

The composite catalyst was prepared by forming the following slurries or solutions:

(1) 355 grams of N-Brand sodium silicate were added to 700 ml. of water and cooled to 40° F.

(2) 7.83 grams McNamee clay and 27.3 grams of the above prepared zeolite Alpha were mixed into 100 ml. of water for 30 minutes.

(3) 76.2 ml. of HCl (37.5 weight percent) were mixed with 900 ml. of water and cooled to 40° F.

The slurry of clay and zeolite Alpha was mixed with the silicate solution. The resulting mixture was then mixed with the acid solution forming a hydrosol which set to a hydrogel in 12 seconds having a pH of 8.45.

The resulting hydrogel was divided into two equal portions. One portion was base exchanged with a 10 weight percent aqueous ammonium chloride solution at 180° F. employing 12 two hour contacts. The base exchanged material was washed free of chloride, dried in air at 230° F., sized to 4 x 10 mesh and tempered in air for 10 hours at 1000° F. The finished catalyst had a sodium content of 0.07 weight percent and a surface area of 237 m.$^2$/gram.

The catalyst was tested for cracking activity by passing vapors of a Mid-Continent Gas Oil having a boiling range of 450 to 950° F. through the catalyst at 900° F., substantially atmospheric pressure, employing a liquid hourly space velocity of 4 and a catalyst to oil volume ratio of 1.5. The volume percent conversion of the gas oil charge to gasoline having an end point of 410° F. was found to be 22.5.

*Example 11*

The second portion of the hydrogel prepared as in example 10 was base exchanged with a 5 weight percent aqueous solution of rare earth chloride at 180° F. employing 12 two hour contacts. The base exchanged material was washed free of chloride, dried at 230° F. in air, sized to 4 x 10 mesh and tempered in air for 10 hours at 1000° F. The finished catalyst had a sodium content of 0.05 weight percent and a surface area of 297 m.$^2$/gram.

The catalyst was tested for cracking activity by passing vapors of a Mid-Continent Gas Oil having a boiling range of 450 to 950° F. through the catalyst at 900° F., substantially atmospheric pressure, employing a liquid hourly space velocity of 4 and a cataylst to oil volume ratio of 1.5. The volume percent conversion of the gas oil charge to gasoline having an end point of 410° F. was found to be 21.2.

It is to be understood that the above description is merely illustrative of preferred embodiments of the invention of which many variations may be made by those skilled in the art within the scope of the following claims without departing from the spirit thereof.

What is claimed is:

1. A crystalline synthetic material having the composition:

$$0.2 \text{ to } 0.5\ R_{2/m}O : 0.5 \text{ to } 0.8\ M_{2/n}O : 1\ Al_2O_3:$$
$$>4.0 \text{ to } 7.0\ SiO_2 \cdot Y\ H_2O$$

where R represents ions selected from the group consisting of metal, methyl ammonium, hydrogen and mixtures thereof with one another; $m$ is the valence of R; M represents ions selected from those of the group consisting of hydrogen, metal and hydrogen-metal mixtures, $n$ is the valence of M and Y is any value up to about 8.0, said material being capable of selectively sorbing straight chain hydrocarbons of more than three carbon atoms from admixture of the same with non-straight chain hydrocarbons when M is sodium and characterized by an X-ray powder diffraction pattern essentially the same as that shown in Table A.

2. A crystalline synthetic material having the composition:

$$0.2 \text{ to } 0.5\ R_{2/m}O : 0.5 \text{ to } 0.8\ Na_2O : 1\ Al_2O_3:$$
$$>4.0 \text{ to } 7.0\ SiO_2 \cdot Y\ H_2O$$

where R represents ions selected from the group consisting of metal, methyl ammonium, hydrogen and mixtures thereof with one another; $m$ is the valence of R; and Y is any value up to about 8.0; said material being capable of selectively sorbing straight chain hydrocarbons of more than three carbon atoms from admixture of the same with non-straight chain hydrocarbons and characterized by an X-ray powder diffraction pattern essentially the same as that shown in Table A.

3. A crystalline synthetic material having the composition:

$$0.2 \text{ to } 0.5\ T_2O : 0.5 \text{ to } 0.8\ M_{2/n}O : 1\ Al_2O_3:$$
$$>4.0 \text{ to } 7.0\ SiO_2 \cdot Y\ H_2O$$

where T is a methyl ammonium ion, M represents ions selected from those of the group consisting of hydrogen, metal and hydrogen-metal mixtures, $n$ is the valence of said metal and Y is any value up to about 8.0, said material being characterized by an X-ray powder diffraction pattern essentially the same as that shown in Table A.

4. A crystalline synthetic material having a composition expressed in terms of oxides as follows:

$$0.2 \text{ to } 0.5\ T_2O : 0.5 \text{ to } 0.8\ Na_2O : 1\ Al_2O_3:$$
$$>4.0 \text{ to } 7.0\ SiO_2 \cdot Y\ H_2O$$

where T is a methyl ammonium ion and Y is any value up to about 8.0, said material being characterized by an X-ray powder diffraction pattern essentially the same as that shown in Table A.

5. A method for synthesizing a crystalline material which comprises preparing a reaction mixture whose composition expressed in terms of oxide mole ratios falls within the following ranges:

$SiO_2/Al_2O_3$ ---------- of from about 15 to about 60.

$\dfrac{H_2O}{Na_2O + [(CH_3)_4N]_2O}$ --- of from about .01 to about .3.

$\dfrac{Na_2O}{Na_2O + [(CH_3)_4N]_2O}$ --- of from about 30 to about 60.

$\dfrac{Na_2O + [(CH_3)_4N]_2O}{SiO_2}$ --- of from about 0.5 to about 1.0.

and maintaining said mixture at a temperature within the range from about 20 to about 90° C. until said crystalline material is formed.

6. A method for synthesizing a crystalline material which comprises preparing a reaction mixture whose composition expressed in terms of oxide mole ratios falls within the following ranges:

$SiO_2/Al_2O_3$ ------------ of from about 15 to about 60.

$\dfrac{Na_2O}{Na_2O + [(CH_3)_4N]_2O}$ --- of from about .01 to about .3.

$\dfrac{H_2O}{Na_2O + [(CH_3)_4N]_2O}$ --- of from about 30 to about 60.

$\dfrac{Na_2O + [(CH_3)_4N]_2O}{SiO_2}$ --- of from about 0.5 to about 1.0.

and maintaining said mixture at a temperature within the range from about 60 to about 80° C. until said crystalline material is formed.

7. A method for synthesizing a crystalline material which comprises preparing a reaction mixture whose composition expressed in terms of oxide mole ratios falls within the following ranges:

$SiO_2/Al_2O_3$ ------------ of from about 15 to about 60.

$\dfrac{Na_2O}{Na_2O + [(CH_3)_4N]_2O}$ --- of from about .01 to about .3.

$\dfrac{H_2O}{Na_2O + [(CH_3)_4N]_2O}$ --- of from about 30 to about 60.

$\dfrac{Na_2O + [(CH_3)_4N]_2O}{SiO_2}$ --- of from about 0.5 to about 1.0.

and maintaining said mixture at a temperature within the range from about 20 to 90° C. until said crystalline material is formed, separating the crystals from the mother liquor, and subjecting the separated crystals to an activation treatment by heating at a temperature in the approximate range of 200 to 600° C.

8. A method for synthesizing a crystalline aluminosilicate zeolite which comprises reaction sodium aluminate with tetramethylammonium silicate, the resulting reaction mixture having a composition expressed in terms of oxide mole ratios within the following ranges:

$SiO_2/Al_2O_3$ _____ of from about 15 to about 60.

$\dfrac{Na_2O}{Na_2O+[(CH_3)_4N]_2O}$ ____ of from about .01 to about .3.

$\dfrac{H_2O}{Na_2O+[(CH_3)_4N]_2O}$ ____ of from about 30 to about 60.

$\dfrac{Na_2O+[(CH_3)_4N]_2O}{SiO_2}$ ____ of from about 0.5 to about 1.0.

maintaining said mixture at a temperature within the approximate range of about 20 to about 90° C. until crystals of said zeolite are formed, separating the crystals from the mother liquor and subjecting the separated crystals to an activation treatment by heating at a temperature in the approximate range of 200 to 600° C.

9. A method for synthesizing a crystalline aluminosilicate zeolite which comprises reacting silica with a solution of sodium aluminate dissolved in tetramethylammonium hydroxide, the resulting reaction mixture having a composition expressed in terms of oxide mole ratios within the following ranges:

$SiO_2/Al_2O_3$ _____ of from about 15 to about 60.

$\dfrac{Na_2O}{Na_2O+[(CH_3)_4N]_2O}$ ____ of from about .01 to about .3.

$\dfrac{H_2O}{Na_2O+[(CH_3)_4N]_2O}$ ____ of from about 30 to about 60.

$\dfrac{Na_2O+[(CH_3)_4N]_2O}{SiO_2}$ ____ of from about 0.5 to about 1.0.

maintaining said mixture at a temperature within the approximate range of about 20 to about 90° C. until crystals of said zeolite are formed, separating the crystals from the mother liquor and subjecting the separated crystals to an activation treatment by heating at a temperature in the approximate range of 200 to 600° C.

10. A method for preparing a catalyst composition which comprises treating with a fluid medium containing a positive ion selected from the group consisting of hydrogen ions and ions capable of conversion to hydrogen ions, a synthetic material having the formula:

0.2 to 0.5 $R_{2/m}O:0.5$ to $0.8M_{2/m}O:1Al_2O_3:$
$>4.0$ to $7.0SiO_2 \cdot Y\ H_2O$ where R represents ions selected from the group consisting of metal, methyl ammonium, hydrogen and mixtures thereof with one another; $m$ is the valence of R; M is a metal and $n$ is the valence thereof and Y is any value up to about 8.0; said treatment being carried out for a period of time sufficient to provide hydrogen aluminosilicate composition having a metal cation content of less than about 10 percent by weight based on the composition.

11. A method for preparing a catalyst composition which comprises treating with an aqueous fluid medium containing a source of positive ions selected from the group consisting of acids and ammonium compounds, a crystalline synthetic aluminosilicate having the formula:

0.2 to 0.5 $R_{2/m}O:0.5$ to $0.8M_{2/m}O:1Al_2O_3:$
$>4.0$ to $7.0SiO_2 \cdot Y\ H_2O$ where R represents ions selected from the group consisting of metal, methyl ammonium, hydrogen and mixtures thereof with one another; $m$ is the valence of R; M is a metal and $n$ is the valence thereof and Y is any value up to about 8.0; carrying out such treatment for a period of time sufficient to provide a hydrogen aluminosilicate composition having a metal cation content of less than about 10 percent by weight, washing the treated material free of soluble anions, and thereafter drying and thermally activating the product by heating at temperatures ranging from about 400° F. to 1500° F. for a period of between about 1 and 48 hours.

12. A hydrogen aluminosilicate composition derived from a precursor material having the formula:

0.2 to 0.5 $R_{2/m}O:0.5$ to $0.8M_{2/n}O:1Al_2O_3:$
$>4.0$ to $7.0SiO_2 \cdot YH_2O$ where R represents ions selected from the group consisting of metal, methyl ammonium, hydrogen and mixtures thereof with one another; $m$ is the valence of R; M is a metal and $n$ is the valence thereof and Y is any value up to about 8.0; said hydrogen aluminosilicate corresponding to the precursor material wherein at least 10 percent of the metal cations represented by M are replaced with a non-metallic ion of positive valence selected from the group consisting of hydrogen ions and ammonium ions capable of conversion to hydrogen ions.

13. A composition comprising a finely divided crystalline aluminosilicate having the formula:

0.2 to 0.5 $R_{2/m}O:0.5$ to $0.8M_{2/n}O:1Al_2O_3:$
$>4.0$ to $7.0SiO_2 \cdot YH_2O$ where R represents ions selected from the group consisting of metal, methyl ammonium, hydrogen and mixtures thereof with one another; $m$ is the valence of R; M represents ions selected from those of the group consisting of hydrogen, metal and hydrogen-metal mixtures, $n$ is the valence of M and Y is any value up to about 8.0; said material being characterized by an X-ray powder diffraction pattern essentially the same as that shown in Table A distributed throughout and held suspended in a matrix therefor.

14. A catalytic composition comprising a finely divided crystalline aluminosilicate having the formula:

0.2 to 0.5 $R_{2/m}O:0.5$ to $0.8M_{2/n}O:1Al_2O_3:$
$>4.0$ to $7.0SiO_2 \cdot YH_2O$ where R represents ions selected from the group consisting of metal, methyl ammonium, hydrogen and mixtures thereof with one another; $m$ is the valence of R; M represents ions selected from those of the group consisting of metals below sodium in the electromotive series, calcium, ammonium, hydrogen and combinations of said ions with one another; $n$ is valence of M and Y is any value up to about 8.0 distributed throughout and held suspended in a matrix therefor.

15. A composition made up of spheroidal particles comprising a finely divided crystalline aluminosilicate having the formula:

0.2 to 0.5 $R_{2/m}O:0.5$ to $0.8M_{2/n}O:1Al_2O_3:$
$>4.0$ to $7.0SiO_2 \cdot YH_2O$ where R represents ions selected from the group consisting of metal, methyl ammonium, hydrogen and mixtures thereof with one another; $m$ is the valence of R; M represents ions selected from those of the group consisting of hydrogen, metal and hydrogen-metal mixtures, $n$ is the valence of M and Y is any value up to about 8.0, said aluminosilicate being characterized by an X-ray powder diffraction pattern essentially the same as that shown in Table A; being in finely divided form and suspended in and distributed throughout an inorganic oxide gel matrix.

(References on following page)

References Cited

UNITED STATES PATENTS

| | | | |
|---|---|---|---|
| 2,865,867 | 12/1958 | Van Dyke et al. | 252—455 |
| 2,916,437 | 12/1959 | Gilbert | 208—120 |
| 2,950,952 | 8/1960 | Breck et al. | 23—113 |
| 2,967,159 | 1/1961 | Gladrow et al. | 252—455 |
| 3,006,153 | 10/1961 | Cook | 252—455 |
| 3,033,778 | 5/1962 | Frilette | 208—120 |
| 3,059,993 | 10/1962 | Barrer et al. | 23—112 |
| 3,314,752 | 4/1967 | Kerr | 252—455 X |

OTHER REFERENCES

Barrer et al., Faraday Soc. Transactions, vol. 54, July–December 1958, pp. 1074–1085.

DANIEL E. WYMAN, *Primary Examiner.*

MAURICE A. BRINDISI, EDWARD J. MEROS,
*Examiners.*

C. F. DEES, *Assistant Examiner.*